United States Patent Office 2,744,928
Patented May 8, 1956

2,744,928

OXIDATION OF UNSATURATED ALDEHYDES
TO ACIDS

Curtis W. Smith and Roy T. Holm, Berkeley, Calif., assignors to Shell Development Company, Emeryville, Calif., a corporation of Delaware No Drawing. Application November 28, 1952,
Serial No. 323,169

8 Claims. (Cl. 260—530)

This invention relates to the production of unsaturated carboxylic acids from the corresponding aldehydes. It deals with a new method of carrying out oxidations of this type using an advantageous combination of catalyst and oxidizing agent.

While saturated aldehydes can be oxidized to carboxylic acids relatively easily, the oxidation of unsaturated aldehydes to the corresponding acids has proven to be so complicated by undesirable side reactions that it has been generally necessary to resort to expensive indirect methods of synthesis of unsaturated carboxylic acids. A successful direct method of producing such acids from unsaturated aldehydes has been described and claimed in our copending application, Serial No. 311,802, filed September 26, 1952. It is an object of the present invention to provide an alternative solution to the problem of successful selective oxidation of unsaturated aldehydes to acids without attack at the unsaturated carbon-to-carbon linkages in the molecule. Another important object is the provision of a new type of catalyst for this reaction which is effective in promoting the desired oxidation without excessive formation of by-products. Another object is to provide a method of oxidizing unsaturated aldehydes in which peroxides can be used as oxidizing agents. Still another object of the invention is the provision of a catalytic method of oxidizing unsaturated aldehydes to acids in which the catalyst can be readily recovered and reused in the process. A special object of the invention is to produce alpha,beta-olefinic carboxylic acids by catalytic oxidation of the corresponding aldehydes with hydrogen peroxide. Still other objects and advantages of the new method will be apparent from the following description of the invention.

It has been found that the oxidation of unsaturated aldehydes to unsaturated carboxylic acids can be effectively carried out using a class of catalysts in which the catalytic agent comprises a heteropoly acid and employing an oxidizing agent having an oxidation potential greater than that of the heteropoly acid employed. Heteropoly acids have been described as useful in catalyzing various reactions of olefinic compounds such as hydration, polymerization and the like, in which the conversion takes place at the unsaturated carbon-to-carbon bond. It was quite unexpected, therefore, to find that unsaturated aldehydes can be converted to acids in the presence of heteropoly acid catalysts without substantial reaction taking place at the unsaturated linkage or linkages present. It was especially contrary to expectations to discover that peroxide oxidation agents can be used in the reaction since these agents are known for their tendency to attack unsaturated linkages with resulting polymerization or oxidation. Thus, Bergsteinnson patent, U. S. 2,373,942 describes and claims the use of heteropolytungstic acids as catalysts for the hydroxylation of the olefinic bonds of unsaturated compounds such as allyl alcohol.

The heteropoly acids used as catalysts in the new process are complex inorganic substances of high molecular weight in which two or more different acid anions or oxides of metals or of metalloids are associated with varying, frequently indeterminate, amounts of combined water as water of hydration. With the combined and hydrating water these acids can have molecular weights of 3,000 or higher. They are polybasic acids and those preferred as catalysts have about 5 to 10 acid hydrogen atoms per molecule as a rule. The proportions in which the different acid anions are present in the heteropoly acid catalysts can vary from 1:1 to 12:1 on an atomic basis. Any of the polyvalent acid-forming elements of groups II to VII of the periodic table can be used to form the heteropoly acid catalysts. These catalysts can be readily prepared in active form in a number of different ways. One suitable method is to dissolve a mixture of salts of the acid-forming elements which are to form the heteropoly acid in water. Typical of the salts which are suitable are the alkali metal borates, aluminates, carbonates, silicates, stannates, plumbates, selenates, nitrates, phosphates, vanadates, arsenates, bismuthates, sulfates, chromates, molybdates and manganates. The salts thus dissolved should be in proportions corresponding to the desired ratio of the other acid-forming elements which is desired in the catalyst. The solution is then acidified, for example, with hydrochloric acid in an amount sufficient to liberate the acids from the salts. The heteropoly acid thus produced can be extracted from the solution with a suitable solvent, for instance, ether, and then recovered from the extract by evaporating off the solvent.

Heteropoly acids containing at least one acid-forming element of group VI of the periodic table are an advantageous class of catalysts for the oxidation of unsaturated aldehydes to the corresponding carboxylic acids by reaction with a per compound oxidizing agent according to the invention. An especially advantageous sub-group of heteropoly acid catalysts of this class are those containing a plurality of different acid-forming elements of group VI, preferably those whose complex anion contains an element of sub-group A of group VI together with one or more elements of sub-group B of the same group. Particularly useful heteropoly acids of this type are the heteropolytungstic and heteropolymolybdic acids of sulfur, selenium and tellurium. However, not only can heteropolychromic acids of sulfur, selenium and/or tellurium be used in the same way, but heteropoly acids derived from other combinations of acid-forming elements of group VI, such as molybdotungstic and chromotungstic acids, etc., are effective catalysts for oxidizing unsaturated aldehydes to acids by reaction with peroxides. More than two different hetero acid-forming elements from group VI can be present in the catalyst, selenomolybdotungstic acid and thiotellurotungstic acid being typical examples of acids of this type which are suitable.

Typical examples of preferred biheteropoly acids of this sub-class which are especially effective are: 12-tungstosulfuric acid, 12-tungstoselenic acid, 9-tungstoselenic acid, 12-tungstotelluric acid, 6-tungstotelluric acid, 3-tungstotelluric acid, 12-tungstochromic acid, 9-tungstochromic acid, 12-tungstomolybdic acid, 9-tungstomolybdic acid, 6-tungstomolybdic acid, 3-chromotungstic acid, 3-molybdotungstic acid and 6-molybdotungstic acid. Advantageous more complex heteropoly acid catalysts of tungsten with other group VI elements are, for instance, 9-tungsto-3-sulfoselenic acid, 9-tungsto-3-selenotelluric acid, 9-tungsto-3-telluroselenic acid, 6-tungsto-6-molybdoselenic acid, 9-tungsto-3-molybdoselenic acid, 9-tungsto-3-chromotelluric acid, 9-molybdo-3-sulfotungstic acid, 9-molybdo-3-selenotungstic acid, 9-molybdo-3-tellurotungstic acid, 9-molybdo-3-chromotungstic acid and 6-chromo- 6-molybdotungstic acid. Other heteropoly acids of group VI elements which are effective catalysts in the new process are 12-molybdosulfuric acid, 12-molybdoselenic acid, 6-molybdoselenic acid, 12-molybdotelluric acid, 9-molybdotelluric acid, 12-chromoselenic acid, 9-chromoselenic acid, 12-chromotelluric acid, 12-molybdochromic acid, 9-chromomolybdic acid, 9-molybdo-3-sulfoselenic acid, 9-molybdo-3-selenotelluric acid, 9-molybdo-3-telluroselenic acid, 9-molybdo-3-chromosulfuric acid, 9-molybdo-3-chromoselenic acid, 9-molybdo-3-chromotelluric acid, 6-chromo-6-molybdoselenic acid and 9-chromo-3-molybdotelluric acid. Also useful are the sulfotungstic acids, e. g., 9-sulfotungstic acid, the selenotungstic and molybdic acids, such as 9-selenotungstic acid and 12-selenomolybdic acid, the tellurotungstic acids as 12-tellurotungstic acid and the like.

Another sub-class of heteropoly acids which are useful catalysts in the process of the invention are the hetero acids containing one or more acid-forming elements from group VI in combination with one or more acid-forming elements from other groups of the perodic table. Heteropoly acids of selenium, tellurium, molybdenum and/or tungsten with acid-forming elements from group V are especially advantageous examples of catalysts of this type. Among these are, for instance, the biheterophosphotungstic acids such as 12-tungstophosphoric acid, 9-tungstophosphoric acid, 6-tungstophosphoric acid, 3-tungstophosphoric acid and 12-phosphotungstic acid, as well as more complex phosphotungstic acids such as 9-tungsto-3-molybdophosphoric acid and 6-tungsto-6-molybdophosphoric acid. Other heteropolytungstic acids of this kind are, for example, 12-tungstoarsenic acid, 9-tungstoarsenic acid, 6-tungstoarsenic acid, 3-tungstoarsenic acid, 12-tungstoantimonic acid, 9-tungstoantimonic acid, 6-tungstoantimonic acid, 12-tungstobismic acid, 9-tungstobismic acid, 6-tungstobismic acid and 3-tungstobismic acid, and the more complex heteropolytungstic acids, such as 9-tungsto-3-arsenostibdic acid, 6-tungsto-6-arsenostibdic acid, 3-tungsto-9-arsenostibdic acid, 9-tungsto-3-bismostibdic acid, 6-tungsto-6-bismostibdic acid, 3-tungsto-9-bismostibdic acid, 9-tungsto-3-stibdoarsenic acid, 9-tungsto-3-bismoarsenic acid, 6-tungsto-6-bismoarsenic acid, 9-tungsto-3-arsenobismic acid, 6-tungsto-6-stibdobismic acid, 3-tungsto-3-bismo-3-arsenostibdic acid and 3-tungsto-3-bismo-3-arsenostibdic acid and 3-tungsto-3-arseno-3-stibdobismic acid. Instead of these heteropolytungstic acids one can use the corresponding heteropolymolybdic acids, such as 12-phosphomolybdic acid, 12-molybdophosphoric acid, 12-molybdoarsenic acid, 12-molybdoantimonic acid, 12-molybdobismic acid and the like. Also effective as catalysts are 12-phosphoselenic acid, 12-phosphotelluric acid, 12-selenoarsenic acid, 12-selenoantimonic acid, 12-telluroantimonic acid and similar heteropoly acids of elements of groups V and VI.

Effective catalysts for the new method of producing unsaturated carboxylic acids also include other heteropoly acids such as the following heteropolytungstic acids: 12-tungstoboric acid, 9-tungstoboric acid, 6-tungstoboric acid, 12-borotungstic acid, 9-tungsto-3-molybdoboric acid and 9-tungsto-3-manganoboric acid, 12-tungstocarbonic acid, 12-tungstomanganic acid, 12-tungstonitric acid, 12-tungstosilicic acid, 12- tungstostannic acid, 12-tungstovanadic acid, periodotungstic acid ($I_2O_7 \cdot 12WO_3 \cdot 11H_2O$), aluminotungstic acid ($Al_2O_3 \cdot 24WO_3 \cdot 65H_2O$) and 9-tungstosilicovanadic acid ($V_2O_5 \cdot SiO_2 \cdot 9WO_3 \cdot 27H_2O$). Silicotungstic, titanotungstic and stannotungstic acids are still other suitable heteropolytungstic acids. Instead of such heteropolytungstic acids one can use silicomolybdic acids, germanomolybdic acids, titanomolybdic acids, stannomolybdic acids, silicomolybdovanadic acids, phosphochromovanadic acids and the like. While all of these catalysts are effective catalysts in the new method, they all do not give equally good results. As a general rule heteropoly acid catalysts containing at least one atom of tungsten and/or selenium are preferred.

The amount of heteropoly acid used as catalyst in the process can be varied widely although as a rule it is desirable to use at least 0.2%, and more preferably at least 2%, based upon the weight of unsaturated aldehyde present. Amounts greater than about 25% seem to give no advantage over smaller amounts. The heteropoly acid catalysts remain dissolved in the reaction mixture throughout the process and can be reused in the reaction after removal of the reaction products therefrom.

The process is carried out with the reactants in the liquid phase. Temperatures within a range of about 10° C. to about 100° C. are suitable for the reaction which is usually substantially complete in three hours or less at the preferred temperature range of about 35° C. to 50° C. Either normal, superatmospheric or subatmospheric pressure can be used. It is preferable that the process be carried out in a liquid medium in the presence of an organic diluent which is a solvent for the unsaturated carboxylic acid produced and preferably also dissolves the unsaturated aldehyde which is being oxidized. Suitable organic solvent-diluents are, for example, alcohols, among which the tertiary alcohols such as tertiary butyl and tertiary amyl alcohols, dimethyl propyl carbinol, methyl diethyl carbinol, 1-methylcyclohexanol, dimethyl phenyl carbinol and the like have the advantage of being quite inert to esterification in the process as normally carried out to produce free unsaturated carboxylic acids. However, primary and secondary alcohols have been found to be also suitable in the process. Examples of such alcohols which have been found to be satisfactory are, for instance, methyl, ethyl, normal- and iso-propyl, normal-, iso- and secondary-butyl and the corresponding amyl and hexyl alcohols. Instead of alcohols, one can use ethers such as diethyl ether, dioxane, etc., ketones, for example, acetone, methyl ethyl ketone, cyclohexanone and the like, or acids such as acetic, lactic, benzoic, chloracetic and similar acids, as well as their methyl, ethyl, normal- or isopropyl, butyl, cyclohexyl and analogous esters can be similarly used.

Hydrocarbons, preferably aromatic hydrocarbons, or chlorhydrocarbons, of which benzene, toulene, xylene, cumene, tertiary butyl toluene, ethylene chloride, tetrachloroethan, chloroform, chlortoluene, etc. are typical, are other types of solvent-diluents which have been found to be suitable for use in the process. Such normally liquid aliphatic hydrocarbons as pentane, hexane, heptane, octane, isooctanes, for example, hydrogenated butylene dimers, and the like are also suitable for use as solvent-diluents, as are normally gaseous hydrocarbons such as propane and the butanes when operating under sufficient pressure to keep them at least partly in the liquid state during the reaction. Unsaturated hydrocarbons can also be used successfully as solvent-diluents in the process. Typical examples of such solvent-diluents are, for instance, liquefied propylene or butylenes, amylenes, hexylenes, etc., liquid olefin polymers such as propylene trimers or tetramers, butylene dimers and trimers, etc. No oxidation of solvent-diluents of this type has been found to take place while unreacted aldehyde is present in the reaction mixture.

The reaction can be carried out batchwise, intermittently or continuously using any suitable procedure. For batchwise reaction, one suitable method is to dissolve the unsaturated aldehyde to be oxidized in one of the foregoing or other suitable organic liquid solvent-diluents or in a mixture of two or more such solvent-diluents and then add the required amount of the heteropoly acid catalyst preferably dissolved in the same solvent to the solution. The chosen oxidizing agent, having an oxidation potential greater than that of the heteropoly acid catalyst, is then added to the solution. The peroxide is advantageously added to the reaction mixture slowly with stirring and careful regulation of the temperature. It is preferred to maintain in the reaction mixture at all times at least an equivalent amount of aldehyde to oxidizing agent and preferably a stoichiometric excess of aldehyde to oxidizing agent since this aids in suppression of by-product formation. It is generally preferable to use about 0.5 to about 1 equivalent of peroxide per equivalent of aldehyde in the unsaturated aldehyde being oxidized. After completion of the oxidation, the unsaturated carboxylic acid produced can be recovered by distilling the reaction mixture or the mixture can be worked up in other suitable ways to obtain the desired final product. When producing highly polymerizable acids such as acrylic acid, polymerization during recovery can be eliminated by avoiding local heating during distillation and bubbling gaseous oxygen through the distillation mixture, the oxygen acting as an effective polymerization inhibitor. Copper is also effective in suppressing polymerization during recovery of the product. The process can be carried out continuously by introducing the oxidizing agent, preferably a peroxide, at spaced points along the path of flow of a solution of the starting unsaturated aldehyde and heteropoly acid catalyst in the chosen organic solvent-diluent as the solution is passed through a tubular reactor, reaction tower, or a plurality of reactors in series, or other suitable form of apparatus in which proper temperatures and flow rates are maintained as previously indicated. Still other reaction methods can be used for carrying out the reaction.

Where the unsaturated carboxylic acid produced is intended as an intermediate for further synthesis, it is often advantageous to use the solution of unsaturated acid in the chosen solvent-diluent for this purpose directly without isolating the acid from the mixture. Thus, when the unsaturated carboxylic acid is to be esterified with a saturated alcohol, such alcohol can be used as the solvent-diluent for the oxidation reaction and upon its completion the mixture can be heated to effect esterification and removal of the water formed. This method of operation has the special advantage that it facilitates recovery of the heteropoly acid catalyst used for the oxidation from the distillation residue after recovery of the unsaturated acid. This residue contains the heteropoly acid catalyst in solution along with any polymerized unsaturated acids formed as by-products in the reaction. These polymers are water-soluble, viscous compounds which are difficult to separate from the heteropoly acid catalyst. The catalyst can be reused in the process without such separation, but it is usually preferable to at least partly separate the catalyst from such polymers before it is reused in the process. When the reaction mixture from the oxidation is subjected to an esterification treatment as above described, it is found that the polymeric acids are esterified and made water-insoluble in the process so that on dilution, with water, of the residue remaining after distilling off the monomeric ester product, the polyesters can be readily separated from an aqueous phase containing the heteropoly acid catalyst in solution. This solution, after concentration, if necessary, contains all the catalyst in a suitable form for reuse in the process.

Where esterification of the unsaturated carboxylic acid product is undesirable, one may first distill off the acid from the oxidation mixture and carry out esterification of the polymeric acid bottoms only by heating with an alcohol and an acid esterification catalyst. The recovery of the heteropoly acid catalyst is then carried out in the same way. Still other methods of catalyst recovery can be used.

It is necessary to use in the process an oxidizing agent having an oxidation potential greater than that of the heteropoly acid catalyst employed. Gaseous oxygen or air or the like is unsuitable for the process. A per compound is most advantageous, preferably a suitable peroxide, most preferably hydrogen peroxide, is employed but other inorganic peroxides or organic peroxides are effective. Typical organic peroxides, are, for instance, tertiary butyl hydroperoxide, benzoyl peroxide, per acids such as peracetic, performic and perphthalic acids and the like. Mixed peroxides obtainable by partial oxidation of hydrocarbons, for example, as described in U. S. Patent 2,376,257, are another example of the peroxides which can be used as the oxidizing agent. Either aqueous or anhydrous peroxide solutions can be used for the reaction, but with aqueous peroxide the yields are generally higher with the more concentrated solutions and it is preferred in the case of aqueous hydrogen peroxide, for example, to use solutions of at least 30%, more preferably at least 50%, by weight, concentration. Aqueous hydrogen peroxide of about 85%–93% concentration gives about the same results in the reaction as anhydrous peroxide.

The process is applicable to the oxidation of a wide variety of unsaturated, preferably olefinic, aldehydes which may be aliphatic, alicyclic or aromatic aldehydes. The aldehydes may be substituted by hydroxy, ether, carboxylic acid, carboxylic acid ester, keto, nitro and like groups or halogen atoms. Acrolein, alpha-chloracrolein, crotonaldehyde, methacrolein, tiglic aldehyde, alpha-ethylacrolein, beta-methyl crotonaldehyde, alpha,beta-dimethyl crotonaldehyde, alpha,gamma-dimethyl crotonaldehyde, beta-ethyl crotonaldehyde, 2-hexenal, alpha-isobutylacrolein, alpha-amylacrolein, citral, alpha- or beta-cyclohexylacrolein, 1-cyclohexene-2-carboxaldehyde, beta-phenethylacrolein, tetrolaldehyde, cinnamaldehyde and the like are representative of the alpha,beta-olefinic aldehydes to which the new process can be applied with special advantage because this type of unsaturated aldehyde gives particularly great difficulty in oxidation to unsaturated acids by prior methods. The new process is equally successful, however, in producing unsaturated carboxylic acids from aldehydes having an olefinic double bond or an acetylenic linkage further removed from the aldehyde group. Typical examples of such aldehydes which have been so used are vinyl acetaldehyde, 3-pentenal, 4-pentenal, methyl vinyl acetaldehyde, isopropenyl acetaldehyde, citronellal, rhodinal and 2-phenyl-4-hexenal. Representative acetylenic aldehydes which can be successfully oxidized to the corresponding acetylenic acids by the process of the invention include, for instance, propargyl aldehyde, amyl propargyl aldehyde, etc. Fumaric acid can be produced from either beta-formylacrylic acid or from fumaric dialdehyde and glutaconic acid from glutaconic dialdehyde by the new method of the invention. Instead of individual unsaturated aldehydes, mixtures of two or more such aldehydes can be oxidized to unsaturated acids in the same way. The unsaturated aldehyde or unsaturated aldehyde mixture need not be pure, but can contain other compounds including saturated aldehydes which may undergo simultaneous oxidation or inert compounds which will not interfere with the reaction.

Whatever combination of unsaturated aldehyde and oxidizing agent is chosen for the reaction, when unsaturated monomeric carboxylic acids are the desired product, it is important, as previously indicated, that the water content of the feed material be regulated so that the amount of water in the reacted mixture, including that produced in the reaction, does not exceed about 30%, and is more preferably not greater than 10%. The highest yields are achieved when such water content is in the range of about 6% to 4% by weight of the reacted mixture.

The following examples, in which the conversions and yields are expressed as mole per cent of the theoretical, illustrate in more detail suitable methods of carrying out the new process and show some of its advantages.

*Example I*

Acrolein (28 g.) dissolved in 175 grams of tertiary butyl alcohol, together with 3.2 grams of 12-tungstoselenic acid as catalyst, was treated with an aqueous solution of 90% hydrogen peroxide concentration in a ratio of 1.0 mole of acrolein per mole of hydrogen peroxide. After 6 hours at 40° C. there was obtained a 25% conversion of hydrogen peroxide to distilled acrylic acid as confirmed by the melting point and mixed melting point of the beta-anilinopropionic acid anilide. The melting point of the anilide was 91° C.–92° C., the melting point of the anilide from authentic acrylic acid being 93° C.–93.5° C. The mixed melting point was also 93° C.–93.5° C., confirming the identity of the acrolein oxidation product as acrylic acid. The yield of acrylic acid, based on reacted acrolein, was 28%.

Under the same conditions using phosphotungstic acid ($P_2O_5 \cdot 24WO_3 \cdot 42H_2O$) as the catalyst, a 21% conversion of hydrogen peroxide to acrylic acid was obtained. Equally good results are also obtained with berylotungstic acid ($BeO \cdot 12WO_3 \cdot 24H_2O$) or 12-tungstomanganic acid as the catalyst.

*Example II*

Methacrolein was oxidized by the procedure of Example I using 1.5 moles of methacrolein per mole of hydrogen peroxide of 90% initial concentration. The methacrolein was used as a 23% solution in tertiary butyl alcohol containing 2% of 12-selenophosphoric acid based upon the weight of methacrolein present. In 6 hours reaction time a 29% conversion of hydrogen peroxide to overheaded methacrylic acid was obtained by careful distillation. The methacrylic acid was identified by reaction with aniline to give beta-anilinoisobutyroanilide; the melting point and mixed melting point with an authentic sample being 119° C.–120° C. The yield of methacrylic acid based upon the converted methacrolein was 45%.

Good results are also obtained by the use of 12-selenosilicic acid and 12-selenoboric acid as catalysts for this reaction.

*Example III*

In the oxidation of alpha-chloracrolein, slow addition of 90% hydrogen peroxide to a solution of about 21% by weight of alpha-chloracrolein in tertiary butyl alcohol, containing about 2% of 6-tungsto-6-selenotelluric acid, over a period of about 6 hours until about one mole of peroxide had been added for each 1.5 moles of aldehyde present gives a conversion of hydrogen peroxide to alpha-chloracrylic acid of about 20% and a yield of alpha-chloracrylic acid of about 25% based on the alpha-chloracrolein consumed when using a reaction temperature of about 40° C.

Under similar conditions good yields of maleic acid are obtained in the reaction of maleic dialdehyde. Equally good results are obtained in these reactions when 12-selenoarsenic or 12-molybdoselenic acids are used as the catalysts.

*Example IV*

Under the conditions of Example III, the oxidation of crotonaldehyde in tertiary amyl alcohol solution with hydrogen peroxide using 6-tungsto-6-molybdophosphoric acid as the catalyst gives good yields of crotonic acid.

In the same way good results are obtained in the oxidation of tiglic aldehyde to tiglic acid, oleyl aldehyde to oleic acid, propargyl aldehyde to propargylic acid and cinnamyl aldehyde to cinnamic acid, using as catalysts 12-vanadoselenic acid or tungstomolybdic acid.

*Example V*

Tetrahydrobenzaldehyde (produced as the adduct of butadiene and acrolein) oxidizes to the corresponding tetrahydrobenzoic acid on treatment with an equal molecular amount of hydrogen peroxide added as a 90% aqueous solution. In about 3 hours reaction at about 50° C., conversions to tetrahydrobenzoic acid of the order of 70% are obtained when using about 5% of 12-selenostibdic acid or 6-chromo-6-tungstoselenic acid as catalyst. Other aldehydes of this kind which can be successfully oxidized in the same way to the corresponding olefinic acids are the methyl tetrahydrobenzaldehydes produced as adducts of acrolein with pentadiene, isoprene and dimethyl pentadiene, 1-methyl-3-cyclohexenecarboxaldehyde and 6-methyl-3-cyclohexenecarboxaldehyde from butadiene with methacrolein and crotonaldehyde, 2,5-endomethylenetetrahydrobenzaldehyde from acrolein and cyclopentadiene, for example.

The same oxidations can be carried out with good results using 12-vanadophosphoric acid, 12-chromoselenic acid or tungstomolybdic acids as the catalyst.

We claim as our invention:

1. A process for preparing an alpha,beta-unsaturated aliphatic carboxylic acid which comprises treating a solution of the corresponding alpha,beta-unsaturated aliphatic aldehyde in a mutual solvent for the aldehyde and the acid with from about 0.5 to about 1 equivalent per equivalent of aldehyde of hydrogen peroxide as the sole effective added oxidizing agent in the presence of a heteropolyacid of at least one acid-forming element of group VI of the periodic table, in a reaction environment the water content of which is regulated so that the amount of water in the reacted mixture does not exceed about 30% by weight and at a temperature within the range of from about 10° C. to about 100° C.

2. A process in accordance with claim 1 wherein the catalyst is a heteropolyacid of tungsten.

3. A process in accordance with claim 1 wherein the catalyst is a heteropolyacid of selenium.

4. A process in accordance with claim 1 wherein the reaction is carried out with about 0.2 to 25% of tungstoselinic acid based on the weight of unsaturated aldehyde present.

5. A process for preparing an alpha,beta-monoolefinic aliphatic carboxylic acid which comprises treating a solution of the corresponding alpha,beta-monoolefinic aliphatic aldehyde in an aliphatic alcohol solvent for the aldehyde and acid with about 0.5 to about 1 equivalent per equivalent of aldehyde of hydrogen peroxide as the sole effective added oxidizing agent in the presence of about 2 to 25% of heteropolyacid of the group consisting of the heteropolyacids of sulfur, selenium and tellurium based on the weight of said aldehyde, in a reaction environment the water content of which is regulated so that the amount of water in the reacted mixture does not exceed about 10% by weight and at a temperature within the range of from about 10° C. to about 100° C.

6. A process in accordance with claim 5 wherein acrylic acid is prepared by treating a solution of acrolein with aqueous hydrogen peroxide at about 35° C. to 50° C.

7. A process in accordance with claim 5 wherein methacrylic acid is prepared by treating a solution of methacrolein in tertiarybutyl alcohol with aqueous hydrogen peroxide of at least 50% concentration at about 35° C. to 50° C.

8. A process in accordance with claim 5 wherein chloroacrylic acid is prepared by treating a solution of chloracrolein with aqueous hydrogen peroxide in the presence of a heteropolyacid of selenium and tungsten at about 35° C. to 50° C.

References Cited in the file of this patent

UNITED STATES PATENTS

| | | |
|---|---|---|
| 2,153,406 | Bauer | Apr. 4, 1939 |
| 2,183,325 | Staudinger | Dec. 12, 1939 |
| 2,212,900 | Groll et al. | Aug. 27, 1940 |
| 2,341,339 | Staudinger et al. | Feb. 8, 1944 |
| 2,377,584 | Staudinger et al. | June 5, 1945 |
| 2,386,365 | Staudinger et al. | Oct. 9, 1945 |
| 2,577,829 | Visor | Dec. 1, 1951 |

FOREIGN PATENTS

| | | |
|---|---|---|
| 560,166 | Great Britain | Mar. 23, 1944 |

OTHER REFERENCES

Payne et al.: J. Am. Chem. Soc., vol. 63, pages 226–8 (1941).

Criegee et al.: Chem. Abstracts, vol. 43 col. 6189 (1949).